United States Patent
Wang et al.

(10) Patent No.: US 10,522,142 B2
(45) Date of Patent: Dec. 31, 2019

(54) VEHICLE-MOUNTED CHARGER HAVING VOICE CONTROL FUNCTION

(71) Applicant: SHENZHEN CHUANGYUANTENG TECHNOLOGY CO., LTD., Shenzhen (CN)

(72) Inventors: Pin Wang, Shenzhen (CN); Lichao Shi, Shenzhen (CN)

(73) Assignee: SHENZHEN CHUANGYUANTENG TECHNOLOGY CO., LTD., Shenzhen (CN)

( * ) Notice: Subject to any disclaimer, the term of this patent is extended or adjusted under 35 U.S.C. 154(b) by 60 days.

(21) Appl. No.: 15/890,352

(22) Filed: Feb. 7, 2018

(65) Prior Publication Data

US 2019/0212974 A1    Jul. 11, 2019

(30) Foreign Application Priority Data

Jan. 11, 2018  (CN) .......................... 2018 1 00274546

(51) Int. Cl.

| G10L 15/22 | (2006.01) |
|---|---|
| G06F 3/16 | (2006.01) |
| H04W 4/80 | (2018.01) |
| B60L 53/16 | (2019.01) |
| B60L 53/30 | (2019.01) |
| H02J 7/00 | (2006.01) |
| H02J 7/02 | (2016.01) |

(52) U.S. Cl.
CPC ............. *G10L 15/22* (2013.01); *B60L 53/16* (2019.02); *B60L 53/30* (2019.02); *G06F 3/165* (2013.01); *G06F 3/167* (2013.01); *H02J 7/0047* (2013.01); *H02J 7/025* (2013.01); *H04W 4/80* (2018.02); *B60L 2230/16* (2013.01); *B60L 2250/30* (2013.01); *G10L 2015/223* (2013.01)

(58) Field of Classification Search
CPC ........................ G10L 15/22; G10L 2015/223
USPC ........................................................ 704/275
See application file for complete search history.

(56) References Cited

U.S. PATENT DOCUMENTS

| 7,427,216 B1* | 9/2008 | Wu ..................... H01R 13/2421 439/638 |
|---|---|---|
| 2001/0006336 A1* | 7/2001 | Yi ............................ H04M 1/11 320/115 |
| 2009/0108825 A1* | 4/2009 | Yang ........................ H02J 7/06 323/288 |

(Continued)

Primary Examiner — Shaun Roberts

(57) ABSTRACT

A vehicle-mounted charger having voice control function includes: a contact plug, a charging socket, a voice acquisition unit, a recognition control unit, and a first BLUETOOTH unit. The voice acquisition unit collects a voice signal and converts the voice signal to an electrical signal. The recognition control unit includes a conversion module, a first storage module, an operation module, and an executive module. The conversion module converts the electrical signal into a data signal and sends the data signal to the operation module. The operation module compares the data signal with predetermined storage data stored by the first storage module, operates the data signal, and sends control command to the executive module. The executive module sends executive command according to the control command. The first BLUETOOTH unit sends BLUETOOTH signal to the portable device according to the executive command to control the portable device to execute corresponding operation.

10 Claims, 12 Drawing Sheets

(56) References Cited

U.S. PATENT DOCUMENTS

| | | | | |
|---|---|---|---|---|
| 2011/0254582 A1* | 10/2011 | Partee | ............... | G01R 31/40 |
| | | | | 324/764.01 |
| 2013/0288600 A1* | 10/2013 | Kuusilinna | ......... | H02J 7/0004 |
| | | | | 455/41.2 |
| 2015/0288215 A1* | 10/2015 | Zhang | ............... | G06F 1/3234 |
| | | | | 713/323 |
| 2016/0303925 A1* | 10/2016 | Liu | ............... | B60C 23/0479 |
| 2016/0359348 A1* | 12/2016 | Xu | ............... | H02J 7/0042 |
| 2017/0040815 A1* | 2/2017 | Todasco | ........... | H02J 7/0047 |
| 2018/0342884 A1* | 11/2018 | Chen | ............... | H02J 7/0029 |
| 2019/0020210 A1* | 1/2019 | Partovi | ............... | H02J 7/025 |

* cited by examiner

VEHICLE-MOUNTED CHARGER HAVING VOICE CONTROL FUNCTION

BACKGROUND OF INVENTION

1. Field of Invention

The present disclosure relates to the field of electrical products, and more particularly to a vehicle-mounted charger having a voice control function.

2. Description of Prior Art

A vehicle-mounted charger in the prior art obtains a power source through a vehicle-mounted power supply connected with vehicles, such that portable device plugged into the vehicle-mounted charger can charge, and function of the vehicle-mounted charger is relatively single.

In order to extend and improve the function of the vehicle-mounted charger, the vehicle-mounted charger loads a frequency modulation (FM) function and a BLUETOOTH function. To be specific, after BLUETOOTH of the vehicle-mounted charger is matched with the portable device, the portable device transmits multi-media files to the vehicle-mounted charger using Wireless BLUETOOTH, the vehicle-mounted charger converts the multi-media files to an FM broadcast, which is received by the vehicle FM system through the FM broadcast, and a vehicle-mounted loudspeaker plays the multi-media files.

However, the multi-media files are playing, for example, music. The portable device switches music and adjusts music volume by manual operation. Thus, the operation is cumbersome, which increases risk of the driving when users drive the vehicles and perform the above operation.

SUMMARY OF INVENTION

The aim of the present disclosure is to provide a vehicle-mounted charger having a voice control function capable of solving issues, such that the manual operation is cumbersome and the risk of the driving increases.

The present disclosure provides a vehicle-mounted charger having voice control function.

The vehicle-mounted charge comprises: a contact plug inserted into a vehicle-charging base and a charging socket connected with the contact plug and charging a portable device.

The vehicle-mounted charge further comprises:

a voice acquisition unit collecting a voice signal and converting the voice signal to an electrical signal;

a recognition control unit comprising a conversion module, a first storage module, an operation module, and an executive module, where the conversion module, the first storage module, the operation module, and the executive module are in communication connection through a bus of the recognition control unit. The conversion module converts the electrical signal into a data signal and sends the data signal to the operation module, and the operation module compares the data signal with predetermined storage data stored by the first storage module, operates the data signal, and sends control command to the executive module. The executive module sends executive command according to the control command; and a first BLUETOOTH unit connected with the recognition control unit, where the first BLUETOOTH unit sends BLUETOOTH signal to the portable device according to the executive command to control the portable device to execute corresponding operation according to the executive command.

The present disclosure provides the vehicle-mounted charger having the voice control function, where the vehicle-mounted charger collects a voice signal of the drivers and converts the voice signal to the electrical signal through the voice acquisition unit, and sends the electrical signal to the recognition control unit. The conversion module of the recognition control unit converts the electrical signal into the data signal and sends the data signal to the operation module. The operation module compares the data signal with predetermined storage data stored by the first storage module. When the data signal is matched with the storage signal, the operation module operates the data signal, and sends control command corresponding to the storage signal to the executive module. The executive module sends the executive command to the first bluetooth unit according to the control command, and sends the executive command to the portable device using the first BLUETOOTH unit, further operating the portable device, switching music, and adjusting volume. Thus, it can be overcome issue that the manual operation is cumbersome and the risk of the driving increases in prior art.

DETAILED DESCRIPTION OF PREFERRED EMBODIMENTS

The present disclosure will further be described in detail in accordance with the figures of the embodiment of the present disclosure.

Figure 1:
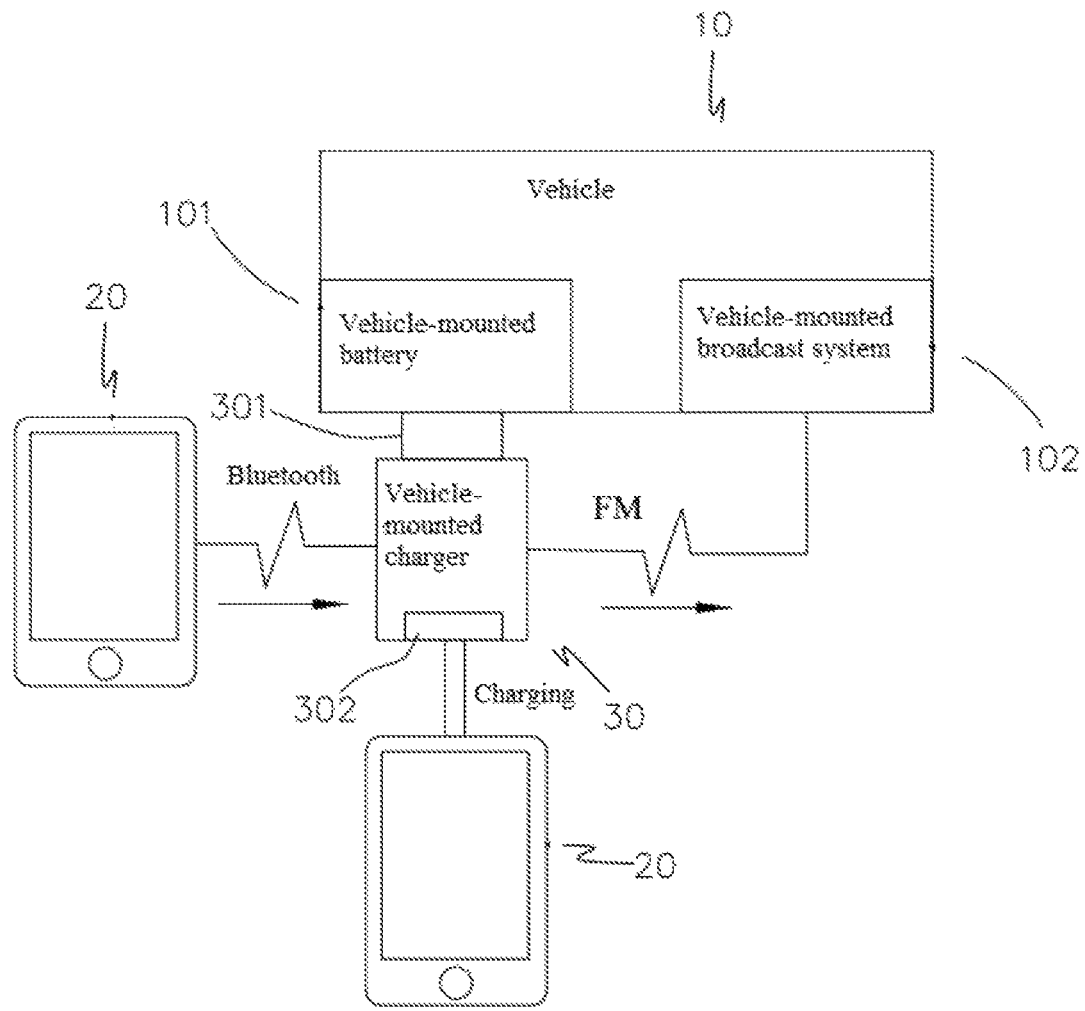
FIG. 1 is a schematic diagram of an operational process of a vehicle-mounted charger having a voice control function of the present disclosure.

As shown in FIG. 1, the present disclosure provides a vehicle-mounted charger 30 having voice control function, where the vehicle-mounted charger 30 having the voice control function is connected with a vehicle-mounted battery to obtain electrical energy, and charges a portable device plugged into the vehicle-mounted charger. To be specific, the vehicle-mounted charger 30 comprises a contact plug 301 and a charging socket 302. The contact plug 301 is inserted into a vehicle 10, and is electrically connected with the vehicle-mounted battery. When the charging socket 302 is plugged into the portable device, the portable device can obtain the electrical energy.

Figure 2:
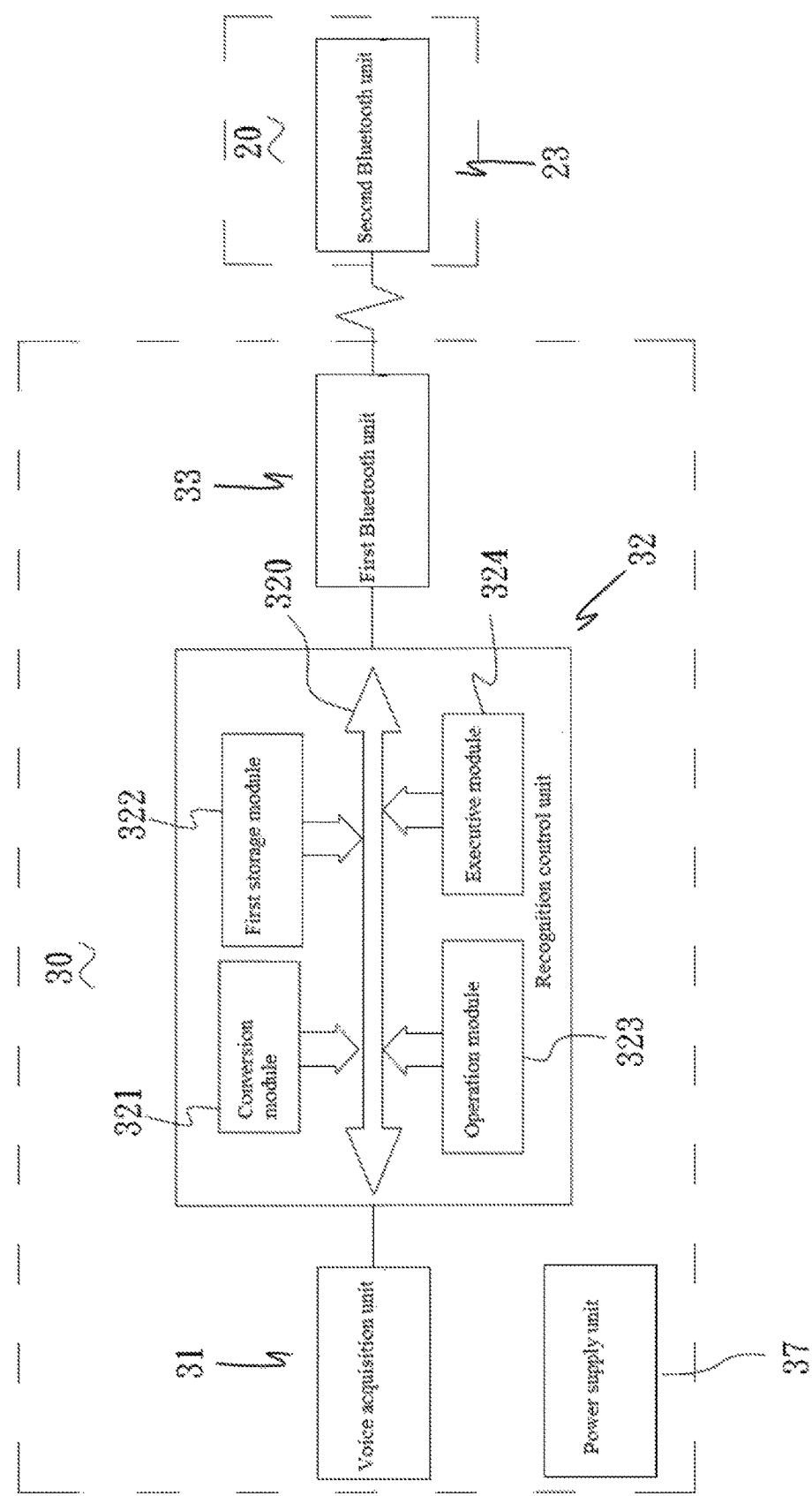
FIG. 2 is a schematic diagram of modules of the vehicle-mounted charger of the present disclosure.

As shown in FIG. 2, the vehicle-mounted charger 30 of the present disclosure comprises a power supply unit 37, a voice acquisition unit 31, a recognition control unit 32 and a first BLUETOOTH unit 33.

Figure 3:
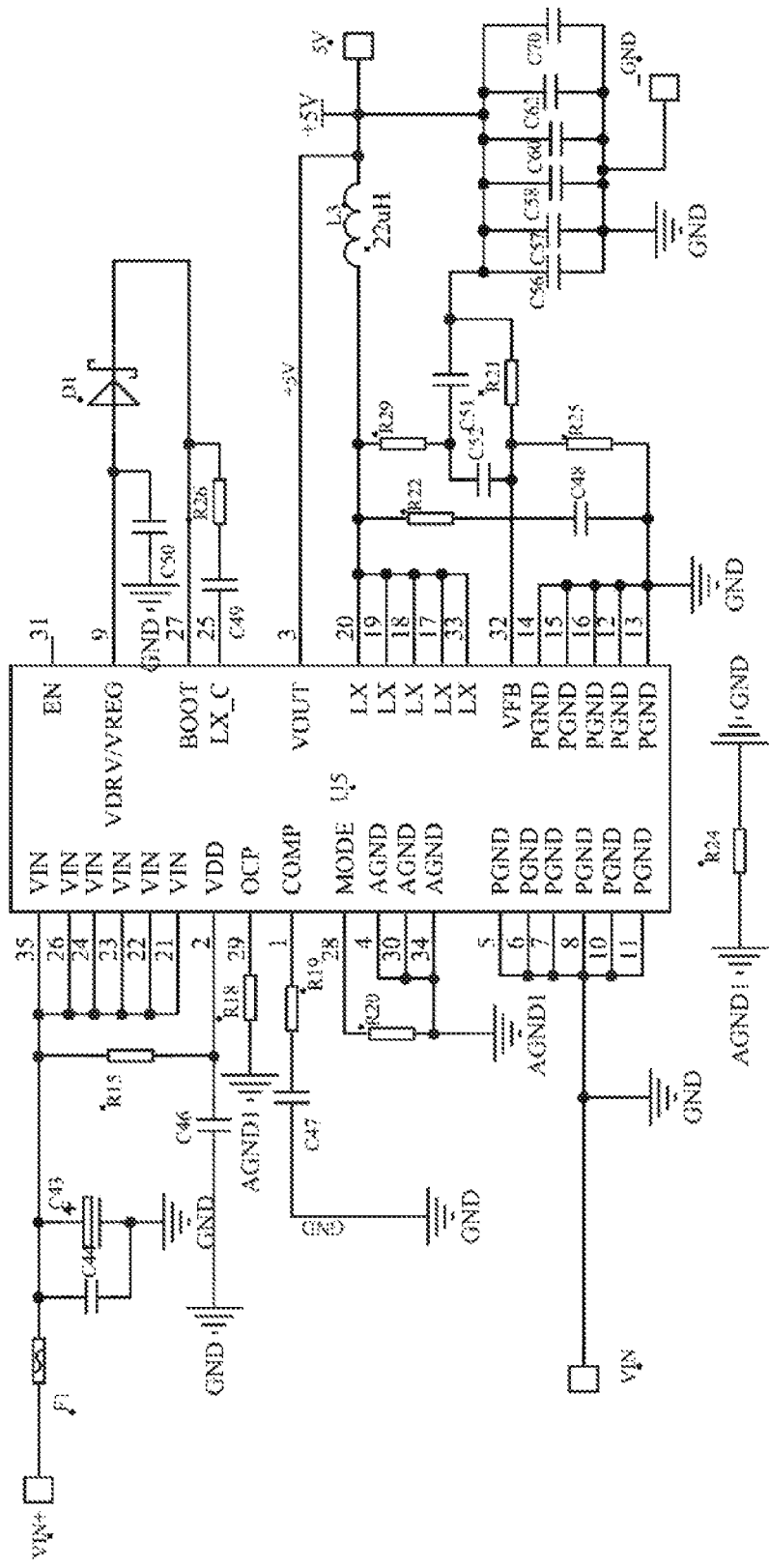
FIG. 3 is a schematic diagram of a circuit of a power supply unit of the present disclosure.

In the embodiment, FIG. 3 is a schematic diagram of a circuit of a power supply unit 37 of the present disclosure, where VIN+ and VIN− are connected with a cathode and anode of the vehicle-mounted battery, respectively. Voltage of the cathode and the anode are sent to a power chip U5, and direct voltage 5V is output through a pin VOUT, where the power chip U5 uses chip of UPI company and model of the chip of UPI company is UP9164. The power chip U5 outputs voltage through some pins VIN and the voltage can be from 10.8V to 30V. Influence of the vehicle-mounted battery on output of the power supply unit 37 can be basically ignore, which can avoid affecting charging of the portable device because of voltage fluctuation of the vehicle-mounted battery. The power chip output the voltage through the pins VOUT and the voltage is output to an inductor L3 through multi-path pins LX, further making the output voltage form an oscillation compensation voltage on the pin VOUT, improving stable of the output voltage of the output voltage of the pin VOUT, providing a feedback voltage stabilization function, improving charging current, making the portable device obtain big charging current, and improving charging efficiency. Function of each pin of the chip UP9164 is shown in table as follow:

5V of the power supply unit is sent to a terminal VMIC to provide work voltage for the pickup sensor. The terminal MCU MIC− and the terminal MCU MIC+ are connected with the conversion module 321 of the recognition control unit 32, further improving anti-interference capability of the pick-up sensor and decreasing noise interference during identifying voice.

In other embodiment, an audio signal is directly input to a terminal MIC_IN as shown in FIG. 3 through an audio input device.

As shown in FIG. 2, in the embodiment, the recognition control unit 32 recognizes the electrical signal and sends an executive command, and sends the executive command to the portable device through Wireless Bluetooth of the first BLUETOOTH unit 33, further finishing control and operation of the portable device.

To be specific, the recognition control unit comprises the conversion module 321, the first storage module 322, the operation module, and the executive module. The conversion module 321, the first storage module 322, the operation module 323, and the executive module are in communication connection through a bus of the recognition control unit. The conversion module 321 converts the electrical signal into a data signal and sends the data signal to the operation module 323. The operation module 323 compares the data signal with predetermined storage data stored by the first storage module, operates the data signal, and sends control command to the executive module. The executive module sends executive command according to the control command.

The present disclosure provides the vehicle-mounted charger 30 having the voice control function, where the vehicle-mounted charger 30 collects a voice signal of the drivers and converts the voice signal to the electrical signal

TABLE 1 function description of pins of the chip UP9164

| Pin No. | Pin Name | Pin Function |
| --- | --- | --- |
| 1 | COMP | Compensation. This pin is output of the error amplifier. The current comparator threshold increases with this control voltage. Connect an RC network to ground for control loop compensation. |
| 2 | VDD | Converter Power Supply Input. This pin provides bias voltage for the IC and powers the internal 5 V linear regulators. Connect this pin to 10.8 V to 30 V voltage source and bypass it with an R/C filter. |
| 3 | VOUT | Output Voltage Feedback. Connect to output capacitor. |
| 4, 30, 34 | AGND | Signal Ground. Connect the return of all small signal components to this pin. |
| 5, 6, 7, 8, 10, 11, 12, 13, 14, 15, 16 | PGND | Power Ground. |
| 9 | VDRV/VREG | 5 V LDO Output and Gate Drive Supply Voltage Input. |
| 17, 18, 19, 20, 33 | LX | Internal Switches Output. Connect this pin to the output inductor. |
| 21, 22, 23, 24, 26 | VIN | Power Supply Input. Input voltage that supplies current to the output voltage. |

In the embodiment, the power supply unit outputs the direct voltage 5V and provides the power source for a conversion module 321, a first storage module 322, an operation module, an executive module, and the first BLUETOOTH unit 33.

Figure 4:
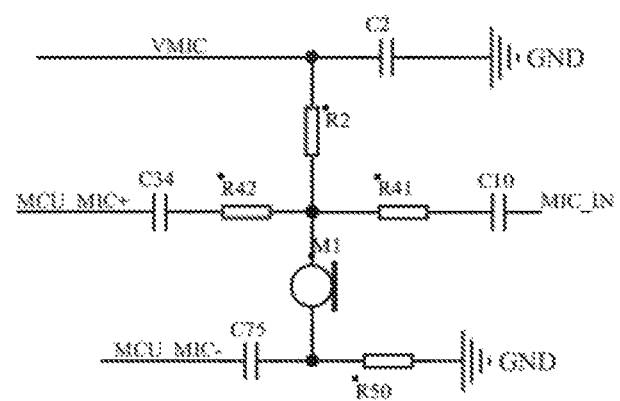
FIG. 4 is a schematic diagram of a circuit of a voice acquisition unit of the present disclosure.

In the embodiment, the voice acquisition unit 31 collects the voice signal and coverts the voice signal to an electrical signal. FIG. 4 is a schematic diagram of a circuit of a voice acquisition unit of the present disclosure where M1 is a pickup sensor, when the pickup sensor M1 sends the electrical signal to a terminal MCU MIC− and a terminal MCU MIC+ after receiving voice vibration, and the direct voltage through the voice acquisition unit 31, and sends the electrical signal to the recognition control unit 32. The conversion module 321 of the recognition control unit 32 converts the electrical signal into the data signal and sends the data signal to the operation module 323. The operation module 323 compares the data signal with predetermined storage data stored by the first storage module 322. When the data signal is matched with the storage signal, the operation module 323 operates the data signal, and sends control command corresponding to the storage signal to the executive module. The executive module sends the executive command to the first bluetooth unit 33 according to the control command, and sends the executive command to the portable device using the first BLUETOOTH unit 33, further operating the portable device, switching music, and adjusting volume. Thus, it can be overcome issue that the manual operation is cumbersome and the risk of the driving increases in prior art.

The embodiment of the present disclosure uses that the conversion module 321, the first storage module 322, the operation module 323, the executive module are integrated in a control chip. The model of the control chip is NUVOTON-ISD9160.

Figure 5:
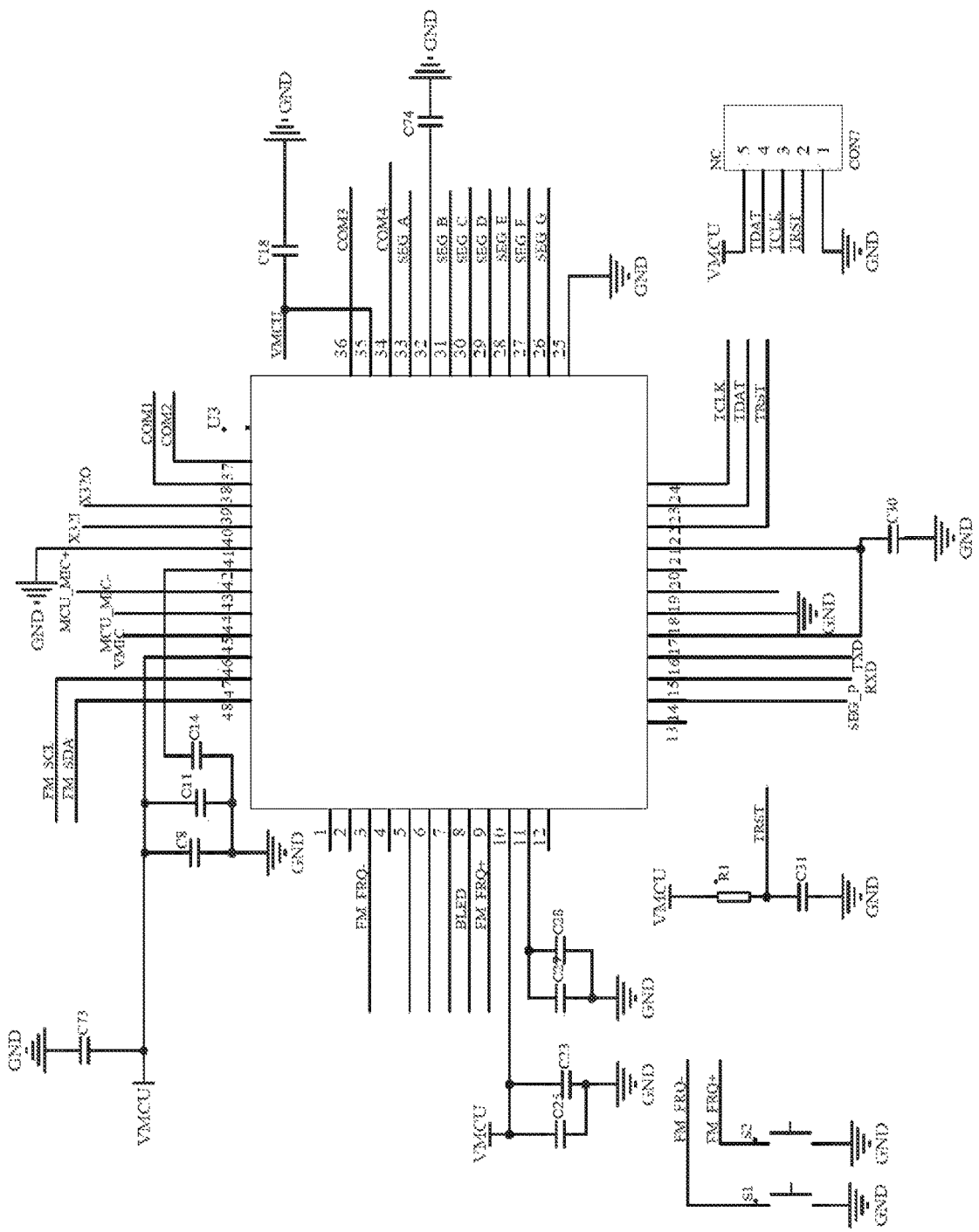
FIG. 5 is a schematic diagram of a circuit of a recognition control unit of the present disclosure.

FIG. 5 is a schematic diagram of a circuit of the recognition control unit 32 of the present disclosure. The model of the chip U3 in FIG. 5 is NUVOTON-ISD9160. The chip applies to an application having low power consumption, audio recording, and playback function. The chip comprises a Cortex-M0 core, highest operational frequency of the chip can reach 50 MHZ, and the chip has a non-volatile flash memory and a static random access memory (SRAM). the chip has an analog-to-digital conversion function with 80 DB of signal-to-noise ratio, and a 61 DB programmable gain amplifier on audio input aspect.

The chip NUVOTON-ISD9160 has general-purpose (input/output) pins (GPIOs) having configurable analog functions, the general-purpose pins can be configured as an analog comparator and also can be regarded as the conversion module 321.

Figure 6:
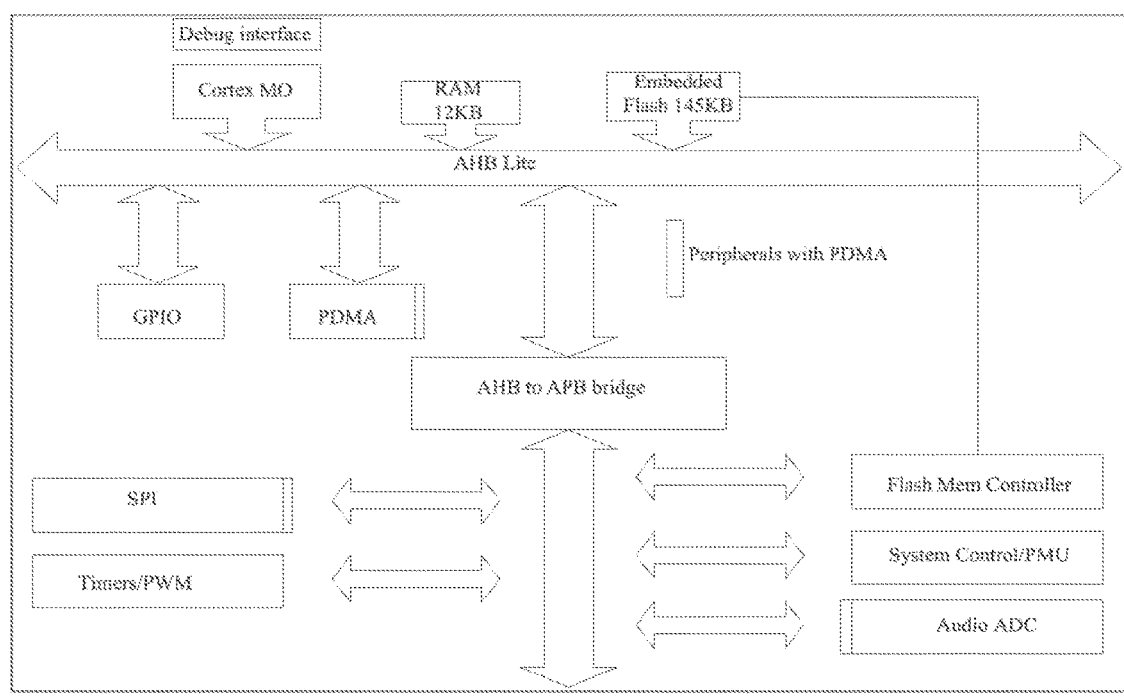
FIG. 6 is a schematic diagram of internal modules of Chip NUVOTON-ISD9160 of the present disclosure.

FIG. 6 is a schematic diagram of internal modules of chip NUVOTON-ISD9160 of the present disclosure. Comparing with FIG. 2, the vehicle-mounted charger 30 of the present disclosure uses the chip NUVOTON-ISD9160 as the recognition control unit 32. To be specific, audio analog-to-digital conversion of the chip is regarded as the conversion module 321 of the present disclosure, an operation process core of the chip is regarded as the operation module 323 of the present disclosure, the static random access memory of the chip is regarded as the first storage module 322 of the present disclosure, and synchronous serial interface is regarded as the executive module of the present disclosure.

In the embodiment, predetermined storage data stored by the first storage module 322 are more, each storage data is in one-to-one correspondence with each control command. The operation module 323 compares the data signal with the storage data, when the data signal is same to at least one of the storage data or corresponds to the storage data. The operation module 323 sends the control command corresponding to the storage data to the executive module As shown in FIG. 4, the terminal MCU MIC−, the terminal MCU MIC+, and the terminal VMIC of the voice acquisition unit 31 are connected with a forty-fifth pin, a forty-fourth pin, a forty-third pin of the chip NUVOTON-ISD9160, respectively, and the voice acquisition unit 31 is connected with the conversion module 321 in FIG. 2. The voice acquisition unit 31 receives the audio signal and sends the audio signal to the conversion module 321 through the bus. The conversion module 321 converts the audio signal to the data signal, and sends the data signal to the operation module of the chip NUVOTON-ISD9160 in FIG. 2. The operation module 323 is stored in the static random access memory (SRAM), namely compares the data signal with the storage data stored by the first storage module 322, sends control command corresponding to the storage signal to the executive module, and is connected with the first BLUETOOTH unit 33 through the executive module. The executive module sends the executive command to the portable device, further finishing control of the portable device, for example, switching music, and adjusting volume.

As shown in FIG. 4, a pin TXD and a pin TRD are connected with the first BLUETOOTH unit 33 to send the control command.

Figure 7:
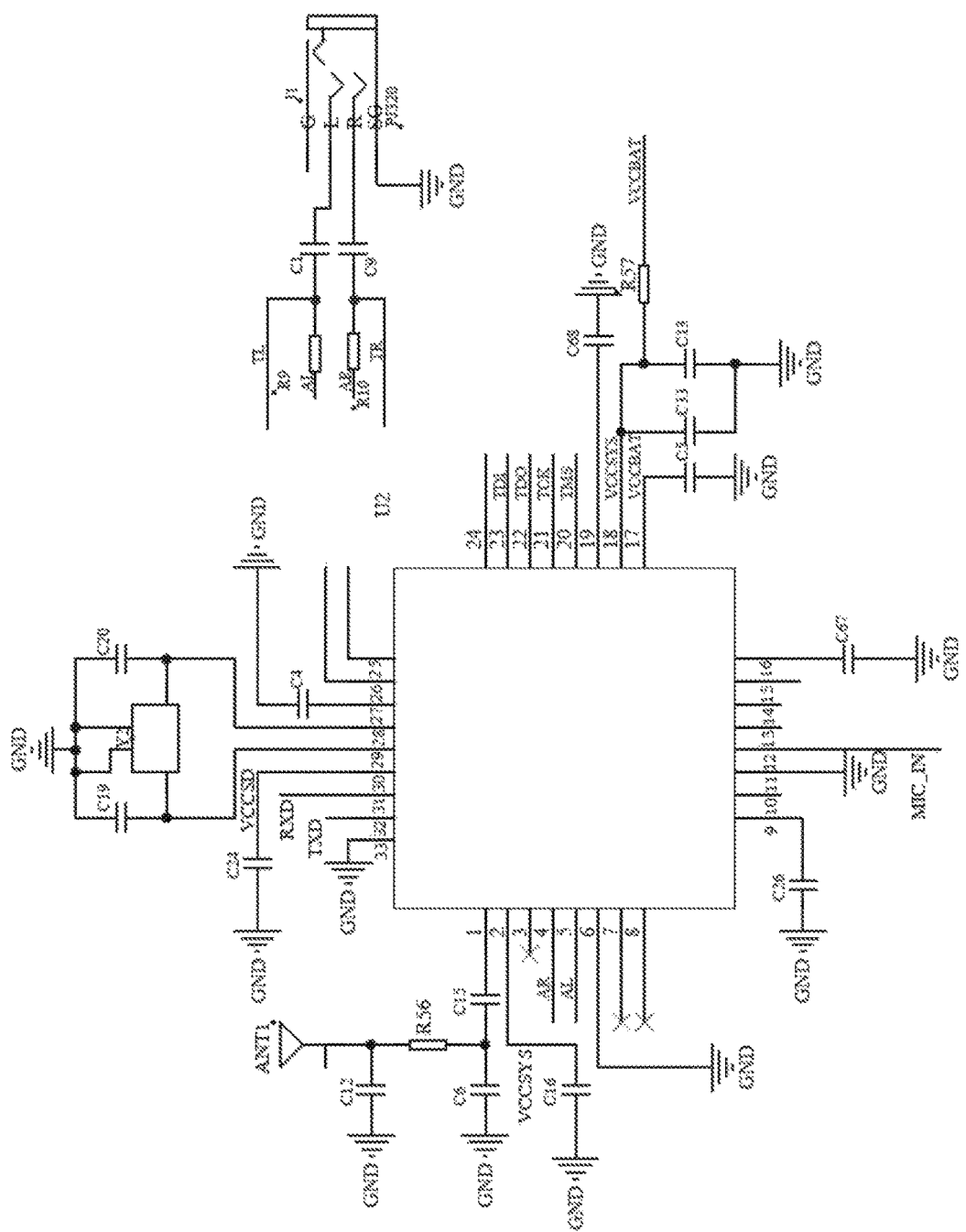
FIG. 7 is a schematic diagram of a circuit of a first BLUETOOTH unit of the present disclosure.

FIG. 7 is a schematic diagram of a circuit of the first BLUETOOTH unit 33 of the present disclosure. In the embodiment, the first BLUETOOTH unit 33 uses a BLUETOOTH chip, where model of the BLUETOOTH chip is BK3254. A thirty-first pin RXD and a thirty-second pin TXD of the BLUETOOTH chip are connected with a sixteen pin RXD and a fifteen pin TXD of the chip NUVOTON-ISD9160, and receive the control command sent by the chip NUVOTON-ISD9160, respectively. The BLUETOOTH chip BK3254 receives the control command, operates, and converts the control command to the wireless BLUETOOTH signal. The wireless BLUETOOTH signal is sent to antenna of a first pin ANT1 to be sent to the portable device.

To be specific, functions of portion pins of the BLUETOOTH chip BK3254 is as follow:

TABLE 2

Functions of portion pins of the BLUETOOTH chip BK3254

| IO Number | IO Name | IO Description |
| --- | --- | --- |
| 1 | GND | Antenna_ground |
| 2 | FMINN | Negative terminal of FM antenna |
| 3 | FMINP | Positive terminal of FM antenna |
| 4 | PREV/VOL− (TMS) | Single-click last song/long-press volume − key |
| 5 | NEXT/VOL− (TCK) | Single-click next song/long-press volume + key |
| 6 | P.P/CALL (TDO) | Play/Pause/Connection phone/Call back/re-match |
| 7 | CHG_MODE (TDI) | BT/FM/TF/U Disk/AUX mode switch |
| 8 | RSTN | Reset (Low level effective) |
| 9 | VOL− (GPIO6) | Single-click volume − key |
| 10 | TX (GPIO0) | Serial port TX (TTL level 3.3 V) |
| 11 | RX (GPIO1) | Serial port RX (TTL level 3.3 V) |
| 12 | MUTE (GPIO9) | Mute control (output low level in mute status), control play terminal |
| 13 | LED0 (GPIO15) | Status indicator |
| 14 | LED1 (GPIO17) | Status indicator |
| 15 | VOL+ (GPIO16) | Single-click volume + key |
| 16 | GND | Power source ground |

| Package Pin # | Name | Description |
| --- | --- | --- |
| 1 | RFP_BT | Bluetooth RF Input and Output |
| 2 | VCCAUD | Audio power supply; Local 1uF decoupling cap |
| 3 | NC/AUDVCM | NC. As AUDVCM only in BK3254E |
| 4 | AUDIORP | Audio output right channel |
| 5 | AUDIOLP | Audio output left channel |
| 6 | GNDAUD | GND of AUD |
| 7 | LINR | Line input right channel |
| 8 | LINL | Line input left channel |
| 9 | VREF1AUD | Audio reference; Connected to 4.7 uF decoupling cap for high audio quality |
| 10 | FMINP | FM input positive |
| 11 | FMGND | GND of FM |
| 12 | MICINP | Microphone input positive |
| 13 | USBP (GPIO2) | USB positive or GPIO 2 |
| 14 | USBN (GPIO3) | USB negative or GPIO 3 |
| 15 | GPIO22 | GPIO 22 |
| 16 | VDD3IO_FLA | LDO output for FLASH, 3 V by default, local 1uF decoupling cap |

In the embodiment, a fourth pin AR and a fifth pin AL of the BLUETOOTH chip BK3254 are electrically connected with a left sound channel and a right sound channel of multi-media plug J1 with 3.5 mm, and the signal is sent to an interface with 3.5 mm to control the first BLUETOOTH unit 33 to output to BLUETOOTH volume and switch play on the antenna.

Figure 8:
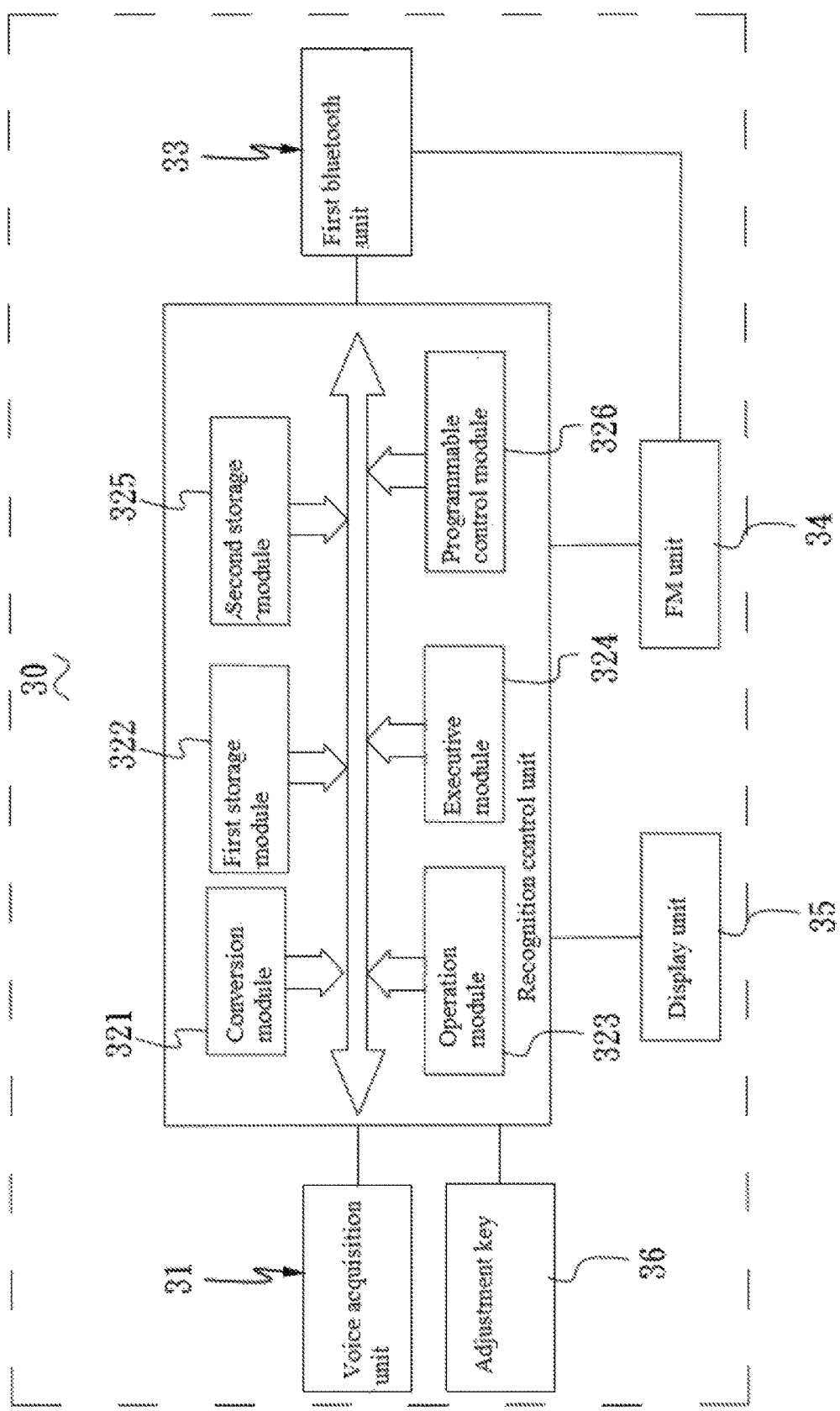
FIG. 8 is a schematic diagram of modules of the vehicle-mounted charger of another embodiment of the present disclosure.

FIG. 8 is a schematic diagram of modules of the vehicle-mounted charger of another embodiment of the present disclosure. In the embodiment, the portable device comprises a second BLUETOOTH unit 23, where the first BLUETOOTH unit 33 is matched with the second BLUETOOTH unit 22 to send the executive module or receive communication data of the portable device to the second BLUETOOTH unit 23. The control command comprises a volume adjustment and a song switch. The communication data of the portable device comprises voice data and audio data.

In other embodiment of the present disclosure, the vehicle-mounted charger further comprises frequency modulation (FM) unit 34, where the FM unit 34 is electrically connected with the recognition control unit 32. The portable device sends the communication data to the recognition control unit 32 and the communication data is sent to a vehicle-mounted broadcast system through the FM unit.

Figure 9:
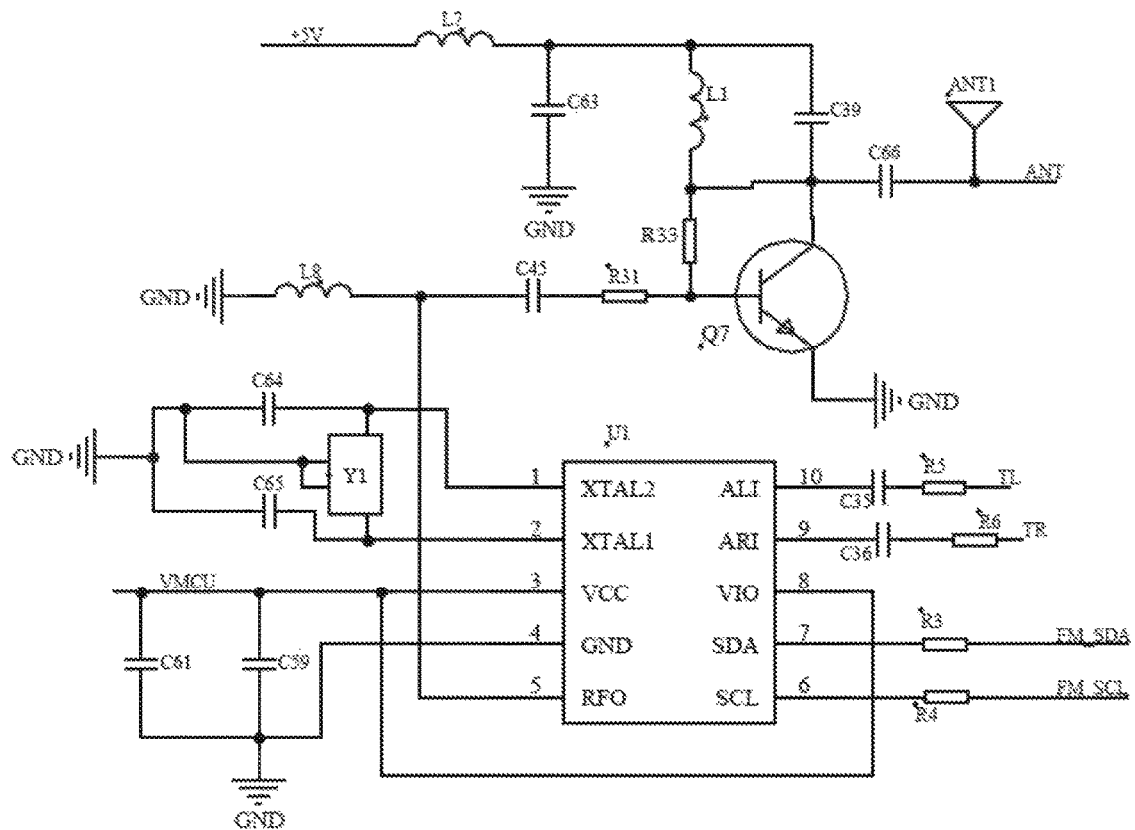
FIG. 9 is a schematic diagram of a circuit of a frequency modulation (FM) unit of the present disclosure.

FIG. 8 is the schematic diagram of modules of the vehicle-mounted charger having the FM unit. FIG. 9 is a schematic diagram of a circuit of the FM unit. To be specific, the FM unit 34 is electrically connected with the recognition control unit 32 and the first BLUETOOTH unit 33. The second BLUETOOTH unit 23 sends the voice data or the audio data of the portable device to the FM unit 34 through the first BLUETOOTH unit 33, at the same time, the recognition control unit 32 generates an FM baseband signal, and the FM unit 34 loads the voice data or the audio data on the FM baseband signal to send external using an FM broadcast way, further being received by the vehicle-mounted broadcast system of the vehicle 10, and achieving playing voice and music using the vehicle-mounted broadcast system of the vehicle 10 as the portable device is connected with the vehicle 10.

In the embodiment of the present disclosure, the FM unit 34 use the chip, where the model of the chip is QN8027 of QUINTIC, functions of pin of the chip QN8027 is shown as follow:

TABLE 3

Functions description of pins of the BLUETOOTH chip QN8027

| PINS | NAME | DESCRIPTION |
| --- | --- | --- |
| 1 | XWAL2 | On-chip crystal driver port 2. If using an external clock source, connect this pin to ground. |
| 2 | XWAL1 | On-chip crystal driver port 1. If using an external clock source, connect this pin to inject the clock. |
| 3 | YCC | Yoltage supply |
| 4 | "ND | "round |
| 5 | R"O | Wransmitter R" output - connect to matched antenna. |
| 6 | >CL | Clock for FC serial bus. |
| 7 | >DA | Bi-directional data line for FC serial bus. |
| 8 | YIO | IO voltage - specifies voltage limit for all digital pins. |
| 9 | ARI | Analog audio input - right channel |
| 10 | ALI | Analog audio input - left channel |

As shown in FIG. 9, the chip QN8027 has two couple input signal terminals, a first couple input signal terminal is a ninth pin TR and a tenth pin TL, the ninth pin TR and the tenth pin TL of the first couple input signal terminal are connected with a fourth pin AR and a fifth pin AL of the main chip BK3254 of the first BLUETOOTH unit 33, respectively, to receive the voice data or the audio data of the first BLUETOOTH unit 33. A second couple input signal terminal is a sixth pin FM SCL and a seventh pin FM SDA, and the sixth pin FM SCL and the seventh pin FM SDA of the second couple input signal terminal are connected with a forty-seventh pin and a forty-eighth pin of the chip NUVOTON-ISD9160 of the recognition control unit 32, respectively. The forty-seventh pin and a forty-eighth pin of the chip NUVOTON-ISD9160 of the recognition control unit 32 output the FM baseband signal to modulate the voice data or the audio data to different frequency bands.

In the embodiment, the chip QN8027 outputs an FM broadcast signal through the first pin RFO, where the first pin RFO is connected with a three-electrode power amplifier tube Q7 before the electrical signal is converted to a high frequency radio signal and the high frequency radio signal is sent through the antenna ANT. The three-electrode power amplifier tube Q7 is used to isolate interference of antenna ANT for external signals, and increases output terminal of the antenna ANT. The first pin RFO is connected with a high-frequency oscillation circuit, and is connected with the antenna ANT, where the high-frequency oscillation circuit is formed by an inductor L1 and a capacitor C39, to the electrical signal is converted to a high frequency radio signal and the high frequency radio signal is sent through the antenna ANT.

FIG. 8 is a schematic diagram of another embodiment of the present disclosure. In the embodiment, the vehicle-mounted charger 30 further comprises an adjustment key 36 and a display unit 35. The display unit 35 is connected with the bus of the recognition control unit 32. The display unit 35 is used to display an FM channel of the FM unit 34. The adjustment key 36 is electrically connected with the recognition control unit 32 to adjust FM of the FM unit 34.

Figure 10:
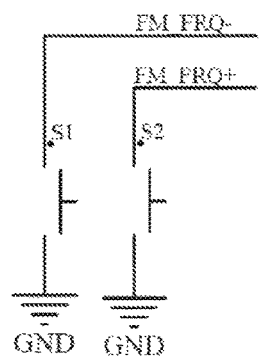
FIG. 10 is a schematic diagram of a circuit of an adjustment key of the present disclosure.
Figure 11:
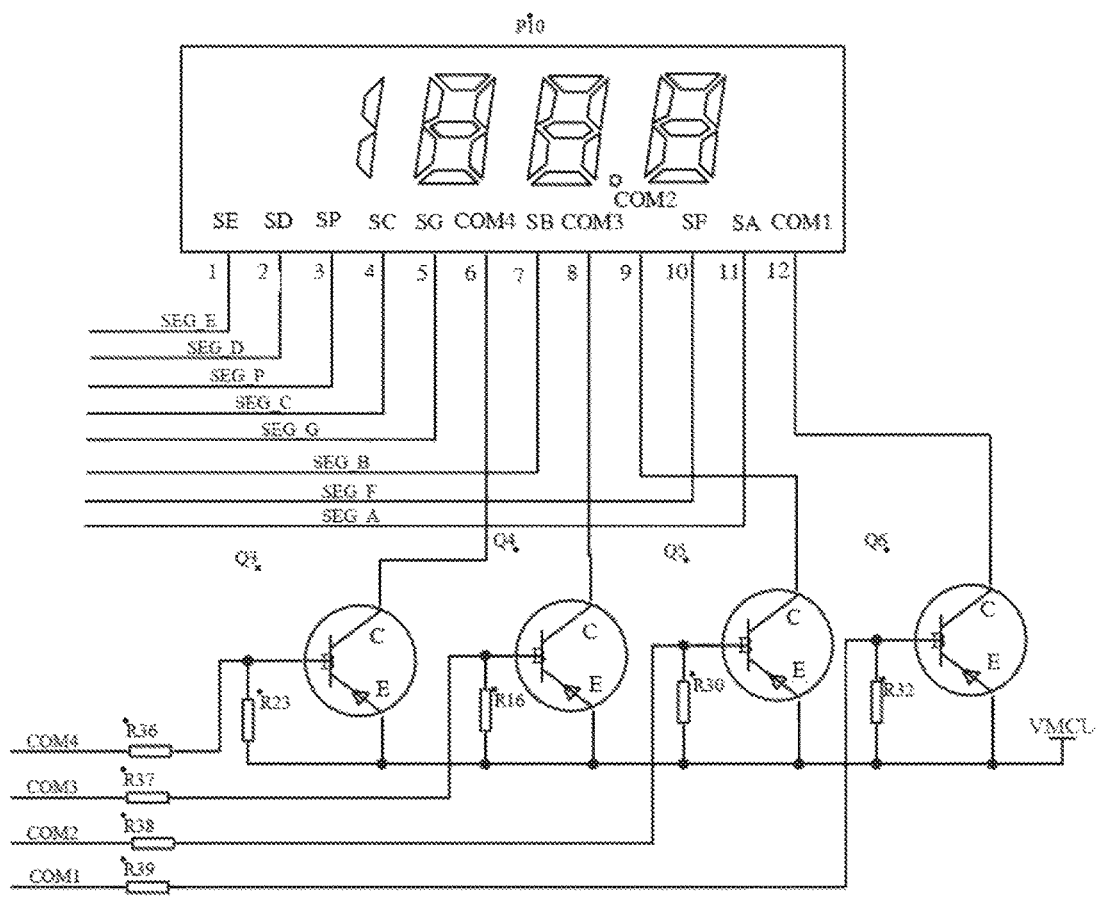
FIG. 11 is a schematic diagram of a circuit of a display unit of the present disclosure.

To be specific, FIG. 10 is a schematic diagram of a circuit of the adjustment key 36 of the present disclosure. FIG. 11 is a schematic diagram of a circuit of the display unit 35 of the present disclosure. The adjustment key 36 comprises a first key S1 and a second key S2, where the first key S1 and the second key S2 are connected with a third pin FM FRQ− and a ninth pin FM FRQ+ of the main chip NUVOTON-ISD9160 of the recognition control unit 32. The third pin FM FRQ− represents to decrease frequency of the FM baseband signal, and the ninth pin FM FRQ+ represents to increase the frequency of the FM baseband signal. When the first key S1 or the second key S2 of the adjustment key 36 are pressed, the frequency of the FM broadcast is adjusted. For example: when the first key S1 of the adjustment key 36 is pressed, the frequency of the FM broadcast is adjusted from 87.5 MHz to 87.4 MHz.

As shown in FIG. 11, the display unit 35 comprises a four-bit display nixie tube, and the four-bit display nixie tube is connected with the main chip NUVOTON-ISD9160 of the recognition control unit 32 through four transistors. A thirty-eighth pin COM1, a thirty-seventh pin COM2, a thirty-sixth pin COM3, and a thirty-fourth pin COM4 output pulse-width modulation (PWM) signal. The PWM signal is regarded as driving source of the four-bit display nixie tube to light the four-bit display nixie tube. A plurality of the display nixie tube are connected with a thirty-third pin SEG A, a thirty-first pin SEG B, a thirtieth pin SEG C, a twenty-ninth pin SEG D, a twenty-eighth pin SEG E, a twenty-seventh pin SEG F, a twenty-sixth pin SEG G, and a fourteenth pin SEG P of the recognition control unit 32 by an eight-bit display control terminal. The main chip NUVOTON-ISD9160 of the recognition control unit 32 drives frequency of FM adjusted by the display unit 35 according to an adjusting signal of the adjustment key 36.

Figure 12:
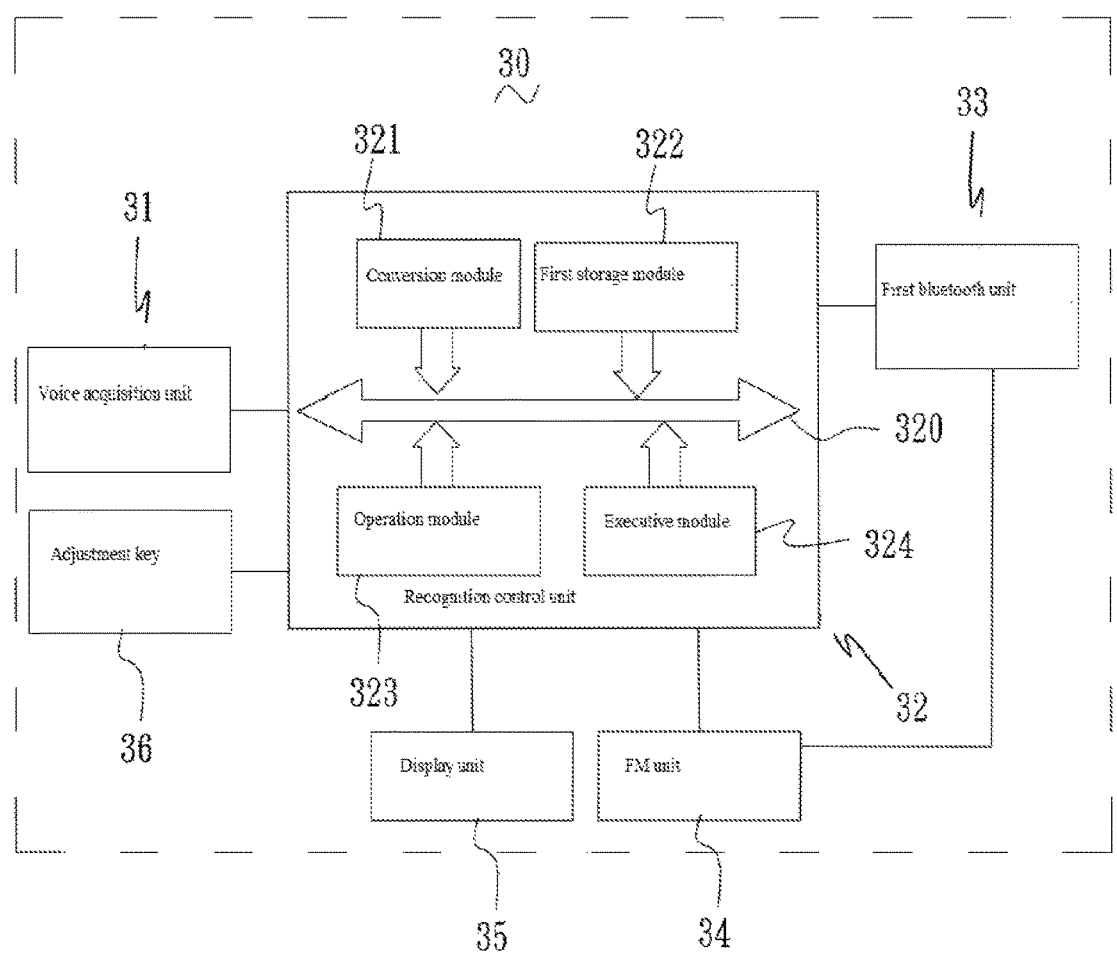
FIG. 12 is a schematic diagram of another module of the vehicle-mounted charger of the present disclosure.

As shown in FIG. 12, the vehicle-mounted charger 30 comprises a second storage module 325 and a programmable control module 326. The second storage module 325 is connected with the bus, and the second storage module stores operational rule of the operation module 323 and/or data converting protocol of the conversion module 321.

The programmable control module 326 is connected with the bus to externally connect with a programmer, where the programmer edits operational rule stored in the second storage module 325 and/or data converting protocol of the conversion module through the programmable control module 326. In the embodiment, the programmer can change the operational rule and the data converting protocol.

The second storage module 325, the programmable control module 326, the conversion module 321, the first storage module 322, the operation module 323, and the executive module are integrated in the control chip NUVOTON-ISD916, further improving integration of the whole circuit and reducing the cost.

Figure 13:
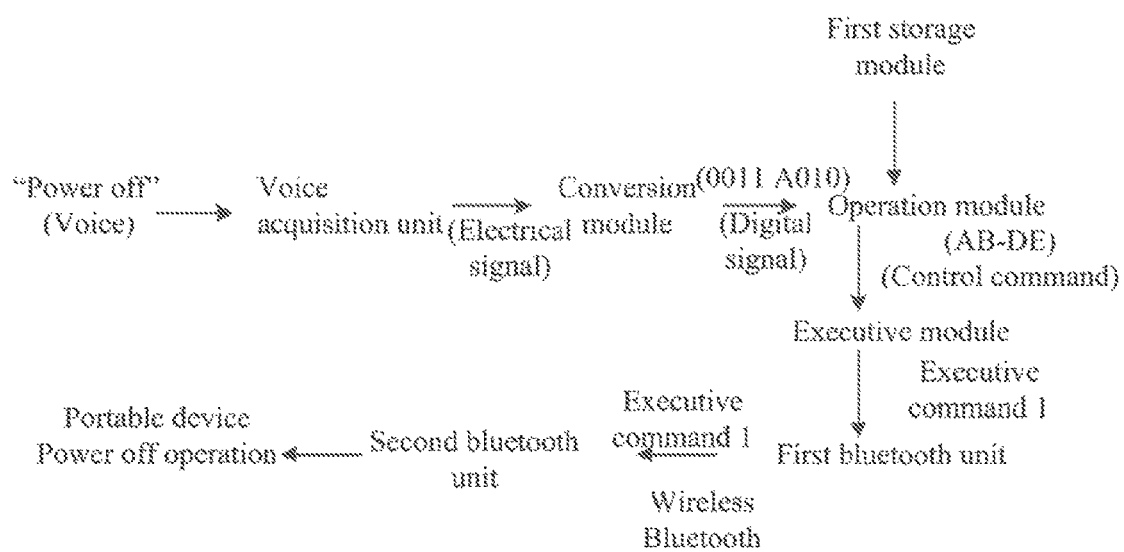
FIG. 13 is a data flowchart of the operational process of the vehicle-mounted charger of the present disclosure.

The operational process and data conversion of the vehicle-mounted charger of the present disclosure are shown in FIG. 13. Firstly, users say operation command "power off", the operation command "power off" is collected by the voice acquisition unit 31, the voice acquisition unit 31 converts the "power off" to the electrical signal, and sends the electrical signal to the conversion module 321. The conversion module 321 converts the electrical signal to form a specific data signal, for example, the data signal is "0011A010". The conversion module 321 sends the data signal "0011A010" to the operation module 323. The operation module 323 compares the data signal with predetermined storage data stored by the first storage module 322, where the storage data is shown in table of FIG. 13. When the data signal is matched with the storage signal, the operation module 323 sends the control command corresponding to the storage signal to the executive module. The executive module converts the control command to the executive module and sends the executive command to the first bluetooth unit 33. The first bluetooth unit 33 sends the executive command to the second bluetooth unit 23 using Wireless BLUETOOTH way, namely the portable device can receive the executive command. The portable device executes the executive command, and the portable device finishes the operation command.

The present disclosure achieves operation of the portable device through the voice to avoid accidents happening because attention is reduced due to the manual operation during driving.

What is claimed is:

1. A vehicle-mounted charger having voice control function, comprising:
a contact plug inserted into a vehicle-charging base;
a charging socket connected with the contact plug and charging a portable device;
a voice acquisition unit collecting a voice signal and converting the voice signal to an electrical signal;
a recognition control unit comprising a conversion module, a first storage module, an operation module, and an executive module; wherein the conversion module, the first storage module, the operation module, and the executive module are in communication connection through a bus of the recognition control unit; the conversion module converts the electrical signal into a data signal and sends the data signal to the operation module; the operation module compares the data signal with predetermined storage data stored by the first storage module, operates the data signal, and sends control command to the executive module; the executive module sends executive command according to the control command; and
a first BLUETOOTH unit connected with the recognition control unit, wherein the first BLUETOOTH unit sends BLUETOOTH signal to the portable device according to the executive command, to control the portable device to execute corresponding operation according to the executive command.

2. The vehicle-mounted charger having the voice control function as claimed in claim 1, wherein a number of the storage data is more, and each storage data is in one-to-one correspondence with each control command; the operation module compares the data signal with the storage data, when the data signal is same to at least one of the storage data or corresponds to the storage data; the operation module sends the control command corresponding to the storage data to the executive module.

3. The vehicle-mounted charger having the voice control function as claimed in claim 2, wherein the portable device comprises a second BLUETOOTH unit; the first BLUETOOTH unit is matched with the second BLUETOOTH unit to send the executive module or receive communication data of the portable device.

4. The vehicle-mounted charger having the voice control function as claimed in claim 3, further comprising: a frequency modulation (FM) unit; wherein the FM unit is electrically connected with the recognition control unit; the portable device sends the communication data to the recognition control unit and the communication data is sent to a vehicle-mounted broadcast system through the FM unit.

5. The vehicle-mounted charger having the voice control function as claimed in claim 4, further comprising: a display unit; wherein the display unit is connected with the bus of the recognition control unit, and the display unit displays an FM channel.

6. The vehicle-mounted charger having the voice control function as claimed in claim 5, further comprising: an adjustment key; wherein the adjustment key is electrically connected with the recognition control unit to adjust frequency modulation of the FM unit.

7. The vehicle-mounted charger having the voice control function as claimed in claim 3, further comprising: a second storage module; wherein the second storage module is connected with the bus, and the second storage module stores operational rule of the operation module and/or data converting protocol of the conversion module.

8. The vehicle-mounted charger having the voice control function as claimed in claim 7, further comprising: a programmable control module; wherein the programmable control module is connected with the bus to externally connect with a programmer; the programmer edits operational rule stored in the second storage module and/or data converting protocol of the conversion module through the programmable control module.

9. The vehicle-mounted charger having the voice control function as claimed in claim 8, wherein the conversion module, the first storage module, the operation module, the executive module, the second storage module, and the programmable control module are integrated in a control chip; model of the control chip is NUVOTON-ISD9160.

10. The vehicle-mounted charger having the voice control function as claimed in claim 1, further comprising: a power supply unit; wherein the power supply unit provides power source for the voice acquisition unit, the recognition control unit, and the first BLUETOOTH unit, and/or converts voltage of the contact plug to charging voltage of the portable device to charge the portable device.

* * * * *